(12) United States Patent
Settle et al.

(10) Patent No.: US 6,233,253 B1
(45) Date of Patent: May 15, 2001

(54) SYSTEM FOR DIGITAL DATA FORMAT CONVERSION AND BIT STREAM GENERATION

(75) Inventors: Timothy Forrest Settle; Thomas Edward Horlander; Kevin Elliott Bridgewater; Ligang Lu, all of Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 08/862,910

(22) Filed: May 23, 1997

(51) Int. Cl.$^7$ .................................................. H04J 3/24
(52) U.S. Cl. .................. 370/474; 370/476; 370/516; 370/538
(58) Field of Search .................. 370/537, 538–539, 370/540, 541, 516, 508, 518, 519, 476, 474, 468

(56) References Cited

U.S. PATENT DOCUMENTS

| | | | |
|---|---|---|---|
| 4,808,008 | * | 2/1989 | Guerillot ............................. 370/474 |
| 4,819,226 | * | 4/1989 | Beckner et al. ..................... 370/395 |
| 5,381,181 | * | 1/1995 | Deiss ................................. 348/423.1 |
| 5,467,137 | | 11/1995 | Zdepski ............................. 348/423 |
| 5,481,543 | * | 1/1996 | Veltman .............................. 370/473 |
| 5,541,919 | * | 7/1996 | Yong et al. ......................... 370/416 |
| 5,581,706 | | 12/1996 | Jessup, Jr. et al. ................. 395/200 |
| 5,598,415 | * | 1/1997 | Nuber et al. ....................... 370/474 |
| 5,652,749 | * | 7/1997 | Davenport et al. ................. 370/466 |
| 5,691,986 | | 11/1997 | Pearlstein ........................... 370/477 |
| 5,757,416 | * | 5/1998 | Birch et al. ......................... 725/144 |
| 5,802,068 | * | 9/1998 | Kudo ................................... 370/538 |
| 5,819,034 | * | 10/1998 | Joseph et al. ..................... 395/200.31 |
| 5,862,153 | * | 1/1999 | Kikuchi et al. ..................... 371/42 |
| 6,081,526 | * | 6/2000 | Saeijs et al. ........................ 370/394 |

FOREIGN PATENT DOCUMENTS

| | | |
|---|---|---|
| 755 157A2 | 1/1997 | (EP) . |
| 762 684 A2 | 3/1997 | (EP) .............................. H04H/1/00 |
| 837 609A2 | 4/1998 | (EP) . |
| 95/26595 | 10/1995 | (WO) . |
| 96/08911 | 3/1996 | (WO) . |
| 98/16067 | 4/1998 | (WO) . |

OTHER PUBLICATIONS

S.Defrance, *Switching MPEG 2*, Jan. 16, 1995, pp. 7/1–7/3, The Institution of Electrical Engineers England.

O. Bungum, *Transmultiplexing, Transcontrol and Transscrambling Of MPEG–2/DVB Signal*, pp. 288–293, International Broadcasting Conf. Sep. 12–16, 1996.

Digital Bitstream Generator For Testing MPEG Video Decoders, by T. Settle et al, I.E.E.E. Transactions on Consumer Electronics, vol. 42, No. 3, Aug. 1996.

* cited by examiner

Primary Examiner—Chau Nguyen
Assistant Examiner—D. Trinh
(74) Attorney, Agent, or Firm—Joseph S. Tripoli; Joseph J. Laks; Ronald H. Kurdyla (57) ABSTRACT

A Conversion system merges and converts data in a plurality of different data formats from a plurality of different sources, to a selected output data format for transmission on a selected transmission channel. A method for digital data format conversion involves de-packetizing an input packetized datastream. A timing recovery parameter is formed in response to a desired output data format. The depacketized data is re-packetized in response to the desired output data format and the timing recovery parameter is incorporated in the re-packetized data. The re-packetized data is multiplexed in response to the selected format and provided to an output channel.

26 Claims, 8 Drawing Sheets

SYSTEM FOR DIGITAL DATA FORMAT CONVERSION AND BIT STREAM GENERATION

FIELD OF THE INVENTION

The invention relates to digital signal processing and in particular to the conversion of data from different input sources and different input formats to form a digital bitstream for output in a selected output format.

BACKGROUND

Homes and workplaces receive different types of data in different data formats for a variety of applications. For example, a home may receive data from satellite or terrestrial sources comprising High Definition Television (HDTV) broadcasts, Multi-point Microwave Distribution System (MMDS) broadcasts, and Digital Video Broadcasts (DVB). A home may also receive data via telephone (e.g. the Internet) and coaxial lines (e.g. cable TV) and from domestic sources such as PCs, Digital Video Disk (DVD), CDROM, VHS and Digital VHS (DVHS™) type players and many other types of sources. Consequently, there is an increasing need for a Conversion system capable of accepting data in different data formats, from a plurality of different sources and that is capable of merging the data and converting it to a selected output data format for transmission on a selected transmission channel. Such a Conversion system is needed to support data processing activities including editing, storage and transmission for multi-media applications.

In such a Conversion system, the input data from multiple sources is in the form of packetized digital data. Input data from other sources e.g. analog video broadcasts, is converted into packetized digital data for processing in the Conversion system. However, there are a number of problems in merging and converting multimedia packetized digital data from different input format sources into a selected output data format. For example, an important factor in determining the way data from one or more different input sources may be merged and re-packetized is the range of data rates that is permitted by a receiving device or by the coding requirements of the desired output signal format.

The desired output data format typically imposes both a minimum and a maximum data rate limit in order to prevent underflow or overflow of an input data buffer in a receiving device. The data rate of the output format is also constrained by the bandwidth characteristics of the transmission channel. Consequently, it is necessary to re-code and re-packetize the input data in a manner that meets these data rate constraints. Other constraints on the format conversion of multimedia input data arise from differences in coding characteristics between the input data format and desired output data format. These coding characteristics include timing, error correction, conditional access and coding type characteristics. The problems involved in merging and converting digital data from different input format sources into a selected output data format are addressed by a system according to the present invention.

SUMMARY

In accordance with the principles of the present invention, a Conversion system merges and converts data in a plurality of different data formats from a plurality of different sources, to a selected output data format for transmission on a selected transmission channel. The Conversion system re-codes and re-packetizes the input data to include timing, error correction, conditional access and coding type parameters compatible with the selected output format. The Conversion system also outputs data at a data rate compatible with selected data format, receiving device and transmission channel characteristics.

A method for digital data format conversion involves depacketizing an input packetized datastream. A timing recovery parameter is formed in response to a desired output format. The depacketized data is re-packetized in response to the desired output format and the timing recovery parameter is incorporated in the re-packetized data. The re-packetized data is multiplexed in response to the selected format and provided to an output channel.

DETAILED DESCRIPTION OF THE INVENTION

During the course of this description like elements will be identified with like numbers according to the different figures that illustrate the invention.

A Conversion system according to the invention is illustrated in FIGS. 1–8. Although the Conversion system is described as providing a selected MPEG compatible output from two MPEG like transport stream input sources, it is exemplary only. The term MPEG (Moving Pictures Expert Group) refers to a widely adopted image encoding standard, hereinafter referred to as the "MPEG standard". The MPEG standard is comprised of a system encoding section (ISO/IEC 13818-1, Jun. 10, 1994) and a video encoding section (ISO/IEC 13818-2, Jan. 20, 1995), hereinafter referred to as the "MPEG systems standard" and "MPEG video standard" respectively. It is to be noted that the conversion described also applies to audio data and miscellaneous data such as Digital Storage Media Control Commands (DSMCC) per annex A of the MPEG systems standard.

The principles of the invention may also be applied to other types of Conversion involving non-MPEG compatible sources and non-MPEG compatible outputs. Non-MPEG compatible sources and outputs may include analog (NTSC) video, cable TV or telephone sources, for example. Further, although the disclosed system is described as processing broadcast program data, this is exemplary only. The term 'program' is used to represent any form of packetized data such as telephone messages, computer programs, Internet data or other communications, for example.

Figure 1:
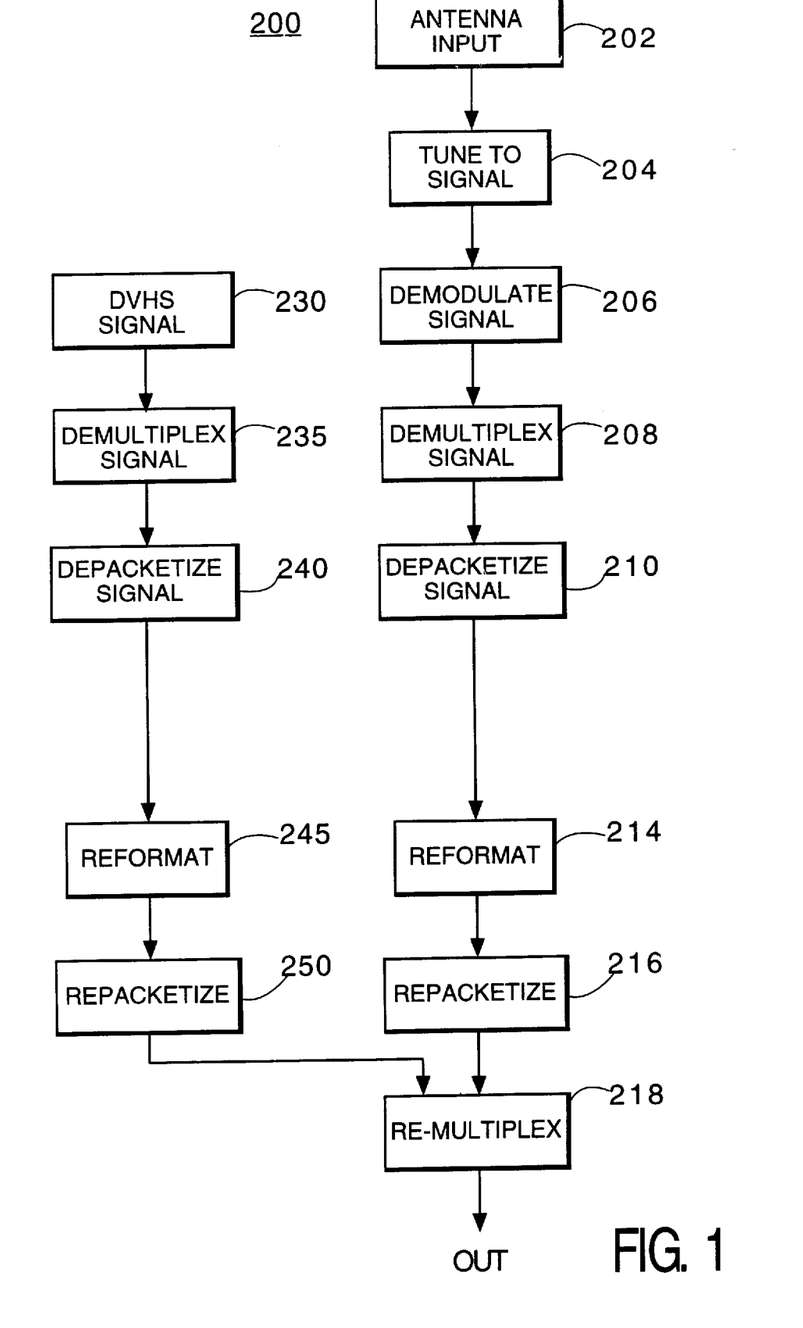
FIG. 1 shows a flowchart for a process for merging and converting data in two different data formats from two different sources, to a selected output data format for transmission on a selected transmission channel.

As an overview, FIG. 1 shows a flowchart for a process for merging and converting data in two different data formats from two different sources, to a selected output data format for transmission on a selected transmission channel.

Antenna 202 of FIG. 1 receives data from a satellite video broadcast source. A demodulator within the Conversion system is tuned, in step 204, to receive an input datastream from antenna 202. The input datastream is demodulated and decoded in step 206 to recover a transport stream containing a User requested program channel. The transport stream is demultiplexed in step 208 to recover data packets comprising the User requested program channel. The data in the recovered program channel packets is separated from ancillary header information in step 210.

In steps 214 and 216, the header-less packets formed in step 210 are re-formatted to be in MPEG compatible transport packet form in response to an output data format selection by a User. In step 214, the header-less packets formed in step 210 are re-aligned and added to new MPEG compatible headers incorporating output format compatible timing information. The re-aligning process of step 214 involves delaying one or other of the header-less packet data and the new headers in order to align and combine them in the correct sequence. In addition, conditional access information may be incorporated in the header data in step 214 as determined by the requirements of the selected output data format. In step 216, error correction data is added to the packets with headers produced in step 214 to form MPEG compatible packets.

Also in FIG. 1, a transport datastream representing selected program material is recovered from a DVHS™ storage source in step 230. The transport stream is demultiplexed in step 235 to recover data packets comprising program material to be merged with the satellite source material previously derived from the antenna in step 202. The data in the DVHS™ data packets is separated from ancillary header information in step 240.

In steps 245 and 250, the header-less packets formed in step 240 are re-formatted to be in MPEG compatible transport packet form in response to the output data format selection of the User. In step 245, the header-less packets formed in step 240 are re-aligned and added to new MPEG compatible headers incorporating output format compatible timing information. The re-aligning process of step 245 involves delaying one or other of the header-less packet data and the new headers in order to align and combine them in the correct sequence. In addition, conditional access information may be incorporated in the header data in step 245 as determined by the requirements of the selected output data format. In step 250, error correction data is added to the packets with headers produced in step 245 to form MPEG compatible packets.

In step 218, the MPEG compatible packets formed in steps 216 and 250 are multiplexed. Also in step 218, additional packets containing conditional access or other application specific information compatible with the selected data output format may be inserted into the datastream. Such application specific information may include, for example, information concerning transmission characteristics such as modulation and coding type or information facilitating decoding of the multiplexed datastream. In addition, NULL packets may be inserted into the output datastream in step 218 to fill the unused data capacity at the output formed in step 218. In addition, in step 218, the merged data packets are buffered and output as a composite MPEG compatible transport datastream at a data rate compatible with the requirements of, the selected output data format, transmission channel bandwidth and the intended receiving device.

The inventive principles governing the re-formatting, re-packetizing, and merging steps (steps 214, 216, 218, 245 and 250) of the Conversion system discussed in connection with FIG. 1 are discussed in more detail in connection with FIGS. 2–8 as follows. It is to be noted that the inventive principles apply to the conversion of a computer system to support analog or digital television, or the conversion and channeling of a DVD video bitstream or DVHS™ bitstream to an MPEG capable set-top box, or to switching a computer display bitstream to a VCR, or to video server applications, for example. Further, because the output data format conversion is controlled within the Conversion system by software, a wide variety of packetized input or output bitstreams may be supported including I.E.E.E. 1394, for example.

The Conversion system is implemented, in this exemplary embodiment, within a desk top PC (personal computer) architecture shown as system 100 in FIG. 6 which is discussed later.

Figure 2:
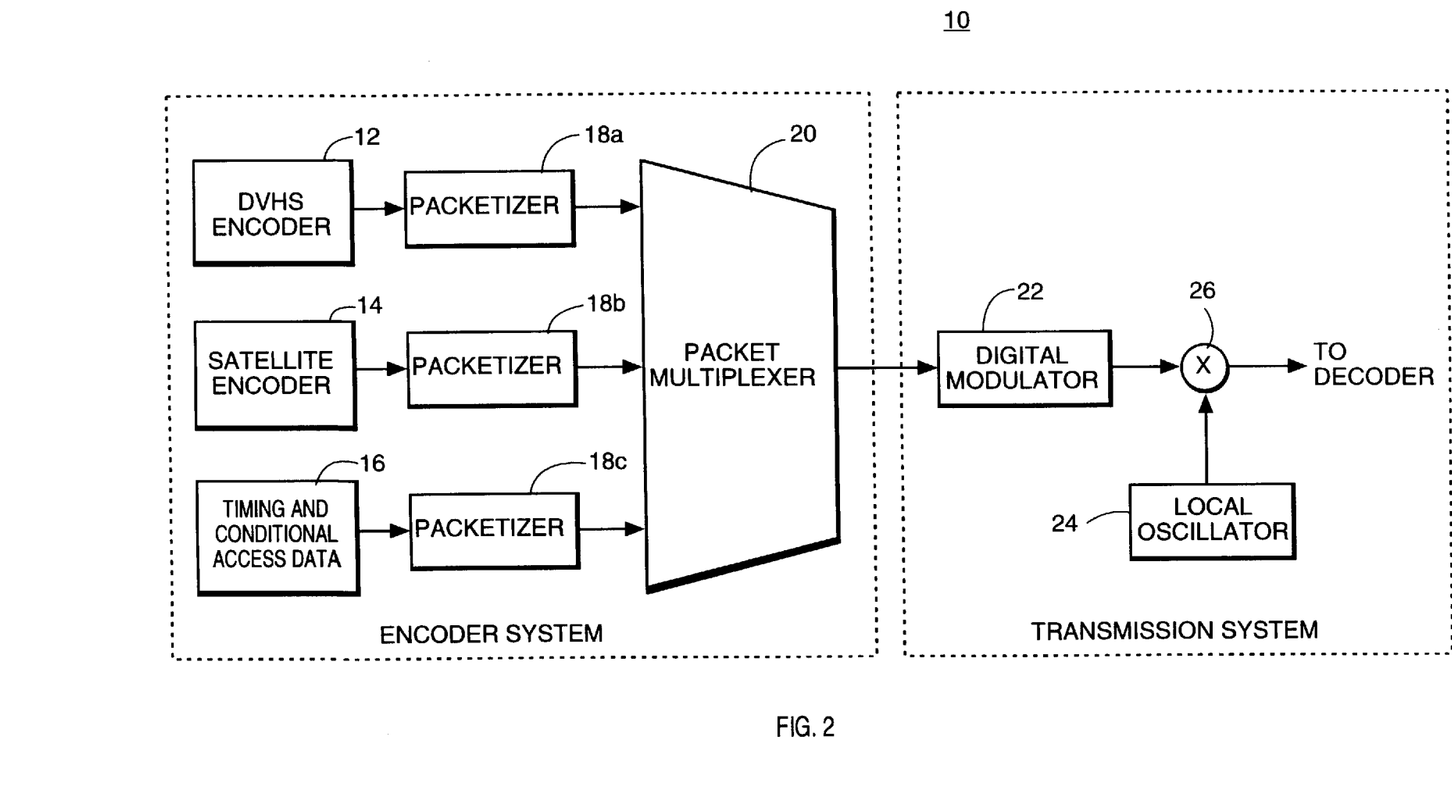
FIG. 2 shows a system, according to the invention, for formatting, packetizing, merging and converting data in two different data formats from two different sources, to a selected output data format for transmission on a selected transmission channel.

FIG. 2 shows an encoder system 10 for formatting, packetizing, and multiplexing data from a satellite and a DVHS™ source, to form composite data in a selected output data format. In unit 14 of FIG. 2, header-less packets of satellite source data are re-formatted to be in MPEG compatible form in response to a User request for MPEG format output data. Unit 14 re-aligns the header-less packets and adds MPEG compatible parameters incorporating output format compatible timing information. Unit 18b adds MPEG transport headers and forms MPEG transport packets with the data produced by unit 14 to form MPEG compatible packets. Similarly, in unit 12, header-less packets of DVHS™ source data are re-formatted to be in MPEG compatible form in response to the User request for MPEG format output data. Unit 12 re-aligns the header-less packets and adds MPEG compatible parameters incorporating output format compatible timing information. Unit 18a adds MPEG transport headers and forms MPEG packets with the data produced by unit 12 to form MPEG compatible packets. Timing and conditional access data compatible with the MPEG transport packets produced in units 12 and 14 is formed in unit 16. Unit 18c periodically incorporates a system clock reference in the packets with headers to form MPEG compatible system transport packets.

Unit 20 multiplexes and merges the satellite data, DVHS™ data and timing MPEG compatible packets, produced by units 18a, 18b and 18c respectively. The data rate and bandwidth of the unit 20 can accommodate a multitude of video, audio, timing, and conditional access data signals. Unit 20 also forms and inserts NULL packets into the multiplexed datastream to fill the unused data transmission capacity in the output datastream from unit 20. In addition, unit 20 buffers and outputs a composite MPEG compatible transport datastream at a data rate compatible with the requirements of the selected output data format, transmission channel bandwidth and an intended receiving device, in accordance with the principles of the invention.

The composite datastream output from unit 20 is modulated to be suitable for transmission on a selected transmission channel by unit 22. In unit 22, the composite datastream output from unit 20 is digitally modulated, filtered, converted from digital to analog, and mixed with a carrier signal produced by local oscillator 24 in mixer 26. The resultant modulated signal is output on a transmission channel to a decoding device.

Figure 3:
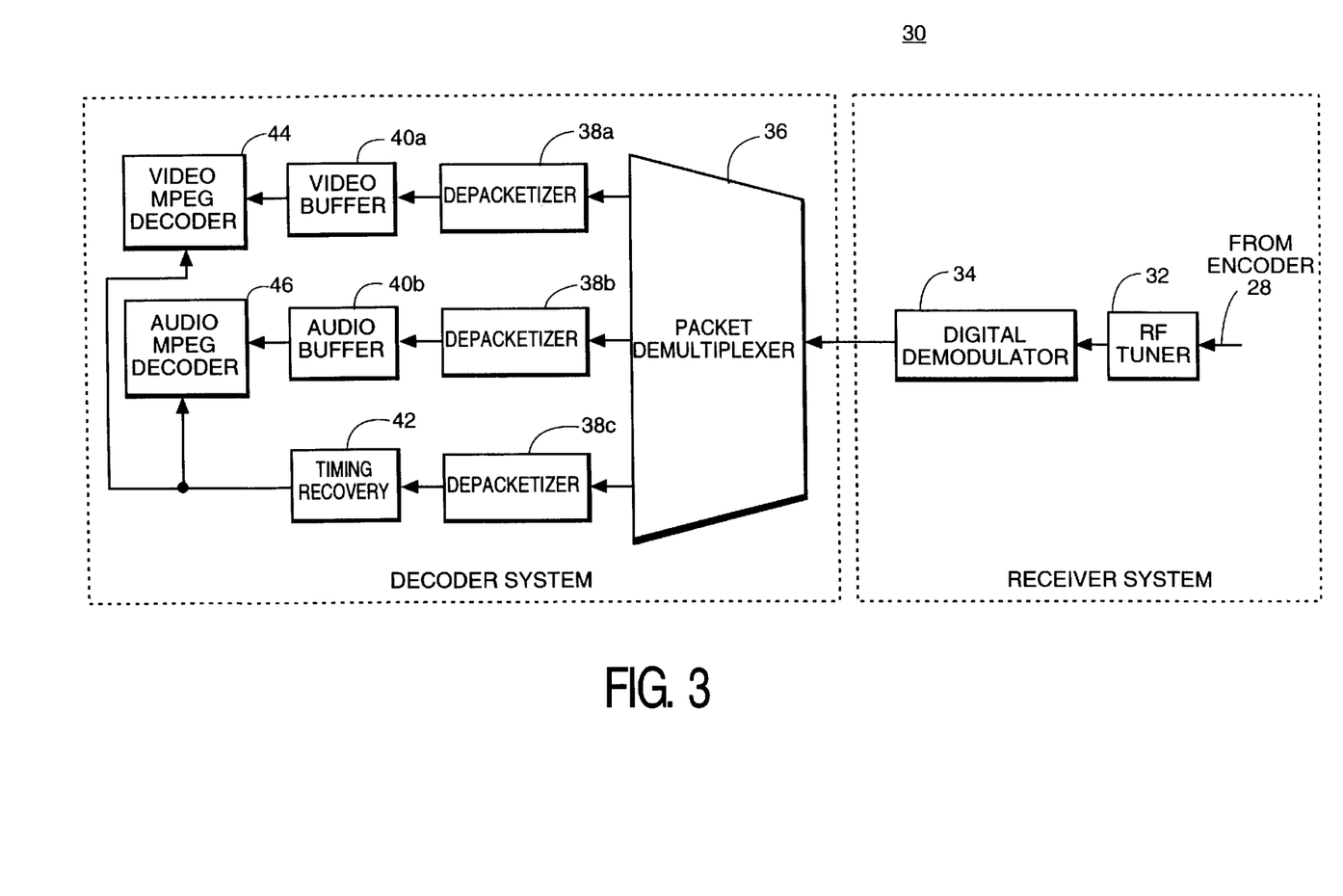
FIG. 3 shows a decoder system, according to the invention, for receiving and decoding a datastream containing data from two different sources.

FIG. 3 shows a decoder system 30, according to the invention, for receiving and decoding a datastream containing data from two different sources. The modulated carrier signal 28 from system 10 of FIG. 2 is converted to digital form and processed by tuner 32 and demodulator 34. Tuner 32 includes radio frequency (RF) tuner and intermediate frequency (IF) mixer and amplification stages for down-converting the input signal to a lower frequency band suitable for further processing. The resultant digital output signal is demodulated and decoded by unit 34 to provide a transport datastream for further decoding by decoder 30.

The transport stream from unit 34 is demultiplexed by unit 36 of decoder 30. Unit 36 separates data according to type based on an analysis of Packet Identifiers (PIDs) contained within header information in the transport stream from unit 34. Unit 36 provides video information packets to unit 38a, audio information packets to unit 38b and timing and conditional access information packets to unit 38c. De-packetizer units 38a, 38b, and 38c provide data and control of associated buffers 40a, 40b and 40c that enables sequential output of video, audio and timing data to video decoder 44 and audio decoder 46. MPEG video and audio decoders 44 and 46 respectively, decode the input video and audio data from units 40a and 40b, in accordance with the MPEG standard, using the timing and conditional access data provided by unit 42.

The encoding and decoding system, comprising encoder 10 of FIG. 2 and decoder 30 of FIG. 3, can be modeled as a rate buffering system. It is necessary to control the data rate in this rate buffering system to keep the buffers 40a and 40b at the decoder 30 from overflowing or underflowing. This problem does not occur if the average rate at which data is consumed at the decoder 30 is equal to the average rate at which data is produced by the encoder 10. Therefore, the encoder 10 and decoder 30 must be synchronized such that they are operating in step with each other. This is the purpose of the timing data provided with the MPEG video and audio data.

Video and audio MPEG encoding is performed on frame boundaries. This implies that the video and audio composite output from the merged sources of system 10 of FIG. 2 is constructed of digitally compressed MPEG data frames, derived from their respective sources. In general, compressed video frames are not the same size as compressed audio frames. Decoding timing data and presentation timing data is produced with each compressed frame of video and audio data. This timing data is used by the decoder to synchronize the decoding and presentation of video and audio frames as they enter the decoder's buffers. A sample of the decoding timing data is referred to as the DTS (Decoding Time Stamp) value. A presentation timing data sample is referred to as the PTS (Presentation Time Stamp) value.

The DTS and PTS timing samples are derived from a common encoder system clock. Sampling the encoder system clock at the video and audio target decoding intervals produces the DTS values for video and audio respectively. In a similar manner, sampling the encoder system clock at the video frame rate and audio frame rate will produce the PTS values for video and audio respectively. As an example, begin with the following definitions:

$F_{ap}$=Audio frame rate in audio frames per second $F_{vp}$=Video frame rate in video frames per second $$T_{ap} = \text{Audio frame period} = \frac{1}{F_{ap}}$$

$$T_{vp} = \text{Video frame period} = \frac{1}{F_{vp}}$$

$T_{ad}(n)$=Audio target decoding time
$T_{vd}(n)$=Video target decoding time
$DTS_a$=Audio decode time stamp
$DTS_v$=Video decode time stamp
$PTS_a$=Audio presentation time stamp
$PTS_v$=Video presentation time stamp
$\emptyset$=Encoder system clock Then video and audio DTS and PTS samples are related to the system encoder clock by the following equations:

$$DTS_a(n)=\emptyset(T_{ad}(n))$$

$$PTS_a(n)=\emptyset(nT_{ap})$$

$$DTS_v(n)=\emptyset(T_{vd}(n))$$

$$PTS_v(n)=\emptyset(nT_{vp})$$

$$n=1,2,3,\ldots$$

The target decoding times, $T_{ad}(n)$ and $T_{vd}(n)$, may vary, whereas the presentation time periods, $T_{ap}$ and $T_{vp}$, are fixed, and periodic.

Figure 4:
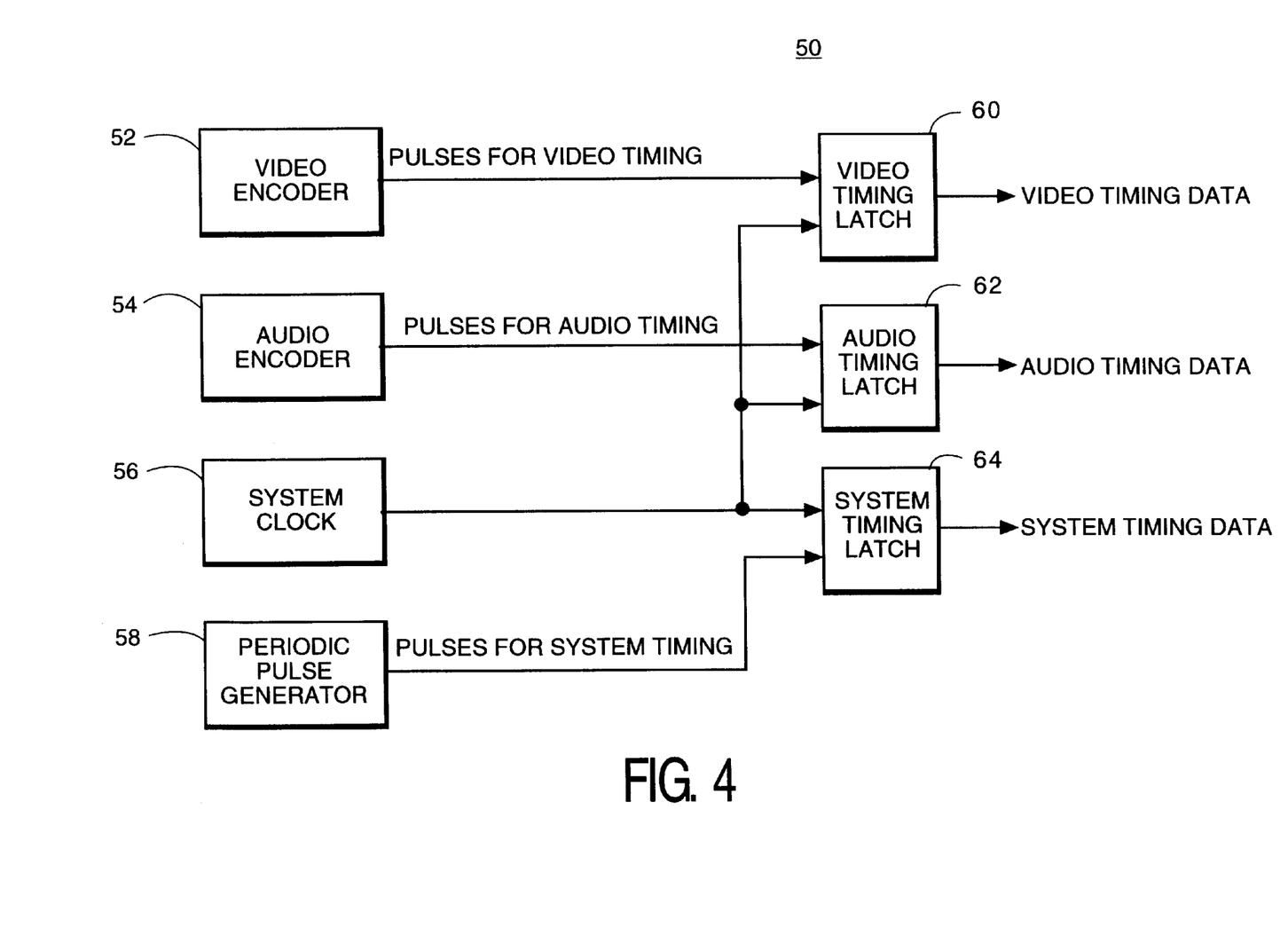
FIG. 4 shows a system for generating timing information for a datastream containing data from two different sources.

In addition to the DTS and PTS samples, periodic samples of the encoder system clock are transmitted to the decoder 30. These samples of the encoder system clock are used by the decoder to synchronize the decoding process to the encoding process. Periodic samples of the encoder system clock are referred to as SCR (System Clock Reference) values. A decoder 30 (FIG. 3) compatible with encoder 10 (FIG. 2) will have a common decoder system clock for audio and video decoding. The SCR values transmitted by encoder system 10, are used by decoder 30 to set the decoder system clock to the same time as the encoder system clock. FIG. 4 shows a system for generating timing information for a datastream containing data from two different sources.

Continuing with the system of FIG. 2, conditional access data derived in unit 16 is provided by encoding system 10 to provide security features to the transmitted data. This may entail the use of an encryption algorithm to scramble the compressed data produced by the satellite and DVHS™ sources in units 12 and 14 respectively. Decoder 30 decrypts the received scrambled data in units 38a and 38b respectively before it is used by the video and audio MPEG decoders 44 and 46. The decryption function is activated by transmitting a conditional access code to decoder 30. This enables a service provider to minimize unauthorized access to encrypted programs.

In the exemplary embodiment of FIG. 2, the data produced by units 12, 14 and 16 is formatted into fixed length transport packets. In addition, as previously mentioned, the audio and video data packets associated with the DVHS™ and satellite data sources are individually identified by a packet identifier code. In encoder system 10 of FIG. 2, there are four transport packet types. These are MPEG video packets, MPEG audio packets, system packets, and NULL packets. MPEG video packets contain MPEG video data, and MPEG audio packets contain MPEG audio data. Typically, a group of transport packets are required to hold all the data associated with one MPEG video frame. This may also be true for an MPEG audio frame. Given this structure, one packet in a group of MPEG video packets will contain the DTS and PTS values for the MPEG video frame represented in that group. Similarly, one packet in a group of MPEG audio packets will contain the DTS and PTS values for the MPEG audio frame represented in that group. A system packet contains an SCR value and conditional access data. NULL packets typically comprise zero-filled data.

Figure 5:
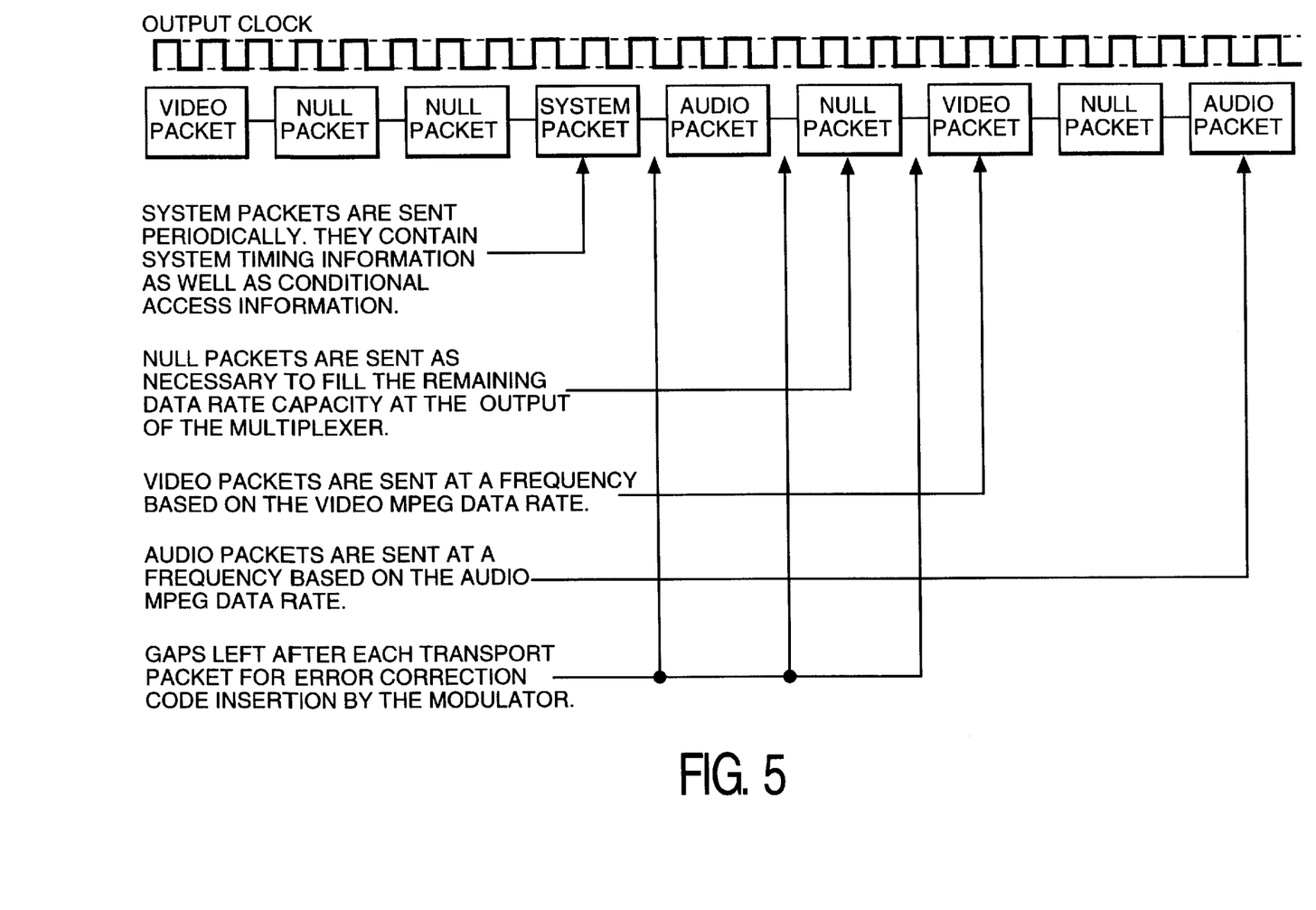
FIG. 5 shows a composite packetized datastream containing data from two different sources.

In encoder 10 (FIG. 2), unit 20 multiplexes the transport packets produced by units 12, 14 and 16 following processing in units 18*a*, 18*b* and 18*c* as previously described. The multiplexing process produces a continuous stream of transport packets containing data from the satellite and DVHS™ sources. Transport packets produced by a particular data source, appear in the multiplexed composite packet stream output by unit 20 at a frequency which is directly proportional to the data rate of its corresponding data source. FIG. 5 shows a composite packetized datastream from unit 20 (FIG. 2) containing data from the satellite and DVHS™ sources.

In the exemplary embodiment, a fixed data rate, at the output of unit 20, is chosen to accommodate the combined data rates of all the data sources corresponding to units 12, 14 and 16. The output data rate capacity of unit 20 is typically greater than the combined data rates of all the data sources. In the example shown in FIG. 5, filler transport packets are transmitted in order to match the output data rate capacity of unit 20. These filler packets are the NULL transport packets mentioned earlier. NULL packets do not contain any useful information for the decoder. Their purpose is to fill the remaining data rate capacity of unit 20

Digital modulator 22 (FIG. 2) in encoder system 10 typically adds some form of error correction code to the output of the unit 20. Error correction coding is used by the demodulator 34 of FIG. 3 to correct for errors in the data received by decoder 30 of FIG. 3. These error correction codes increase the reliability of transmitting the data. Each transport packet produced by the unit 20 (FIG. 2) has a finite length error correction code added to it. Therefore, unit 20 leaves a finite length gap at the end of each transport packet in the composite output transport stream for the insertion of this error correction code by the modulator 22. The added error correction code enables demodulator 34 of decoder 30 of FIG. 3 to correct errors introduced into the packet data during transmission.

Figure 6:
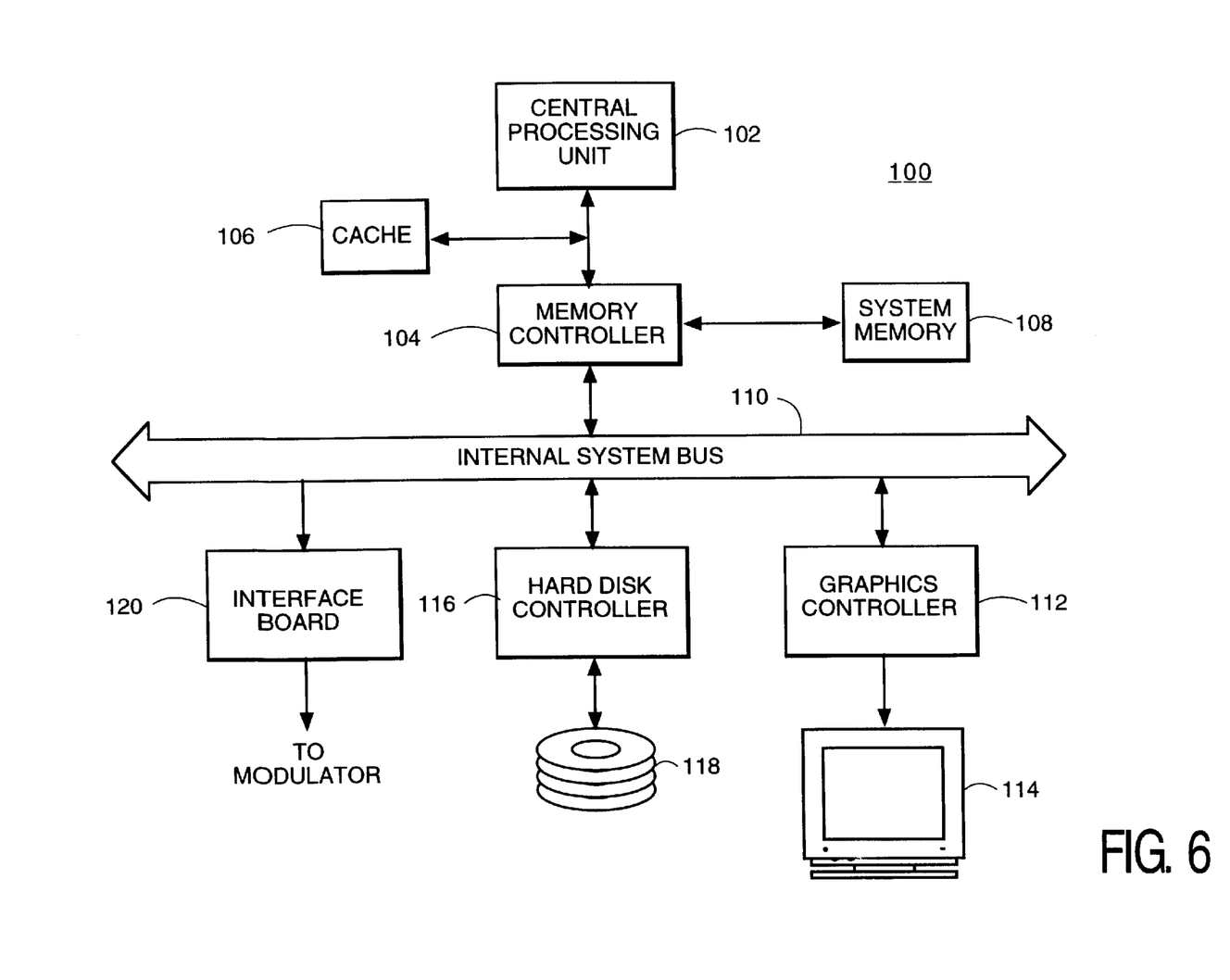
FIG. 6 shows a computer architecture implementing a Conversion system, according to the invention, for merging and converting data in two different data formats from two different sources, to a selected output data format for transmission on a selected transmission channel.

FIG. 6 shows a computer architecture implementing a Conversion system, according to the invention, for merging and converting data in two different data formats from two different sources, to a selected output data format for transmission on a selected transmission channel. The Conversion system interface board 120 connects to one of the internal PC bus 110 card slots. Therefore, PC 100 with the Conversion system interface board plugged into it, constitutes the hardware implementation of the Conversion system.

System 100 performs three initialization tasks in performing the process of data format conversion. Firstly, the Conversion system interface board is configured for the selected input and output data formats. Secondly, the input data comprising data from the satellite and DVHS™ sources, as well as timing and conditional access data, is sequentially loaded into the RAM (Random Access Memory) of the PC 100. Then, a schedule for transmitting transport packets from each of the data sources is established.

A PC was chosen as the computing platform due to its well known architecture and low cost. It is necessary to output composite transport stream data from unit 20 (FIG. 2) at a rate compatible with the selected output data format requirements and the buffering capacity of decoder 30 (FIG. 3). This requirement implies that data must flow through PC 100 at a data rate greater than, or equal to, the output data rate of unit 20. There are tasks involved in the data format conversion other than transferring data. Consequently, it is required that the data transfer rate through the PC is several times greater than the target output data rate. PC 100 implements an internal bus architecture that supports the data transfer rate required. The PC architecture provides three advantages including:

1. High rate data transfers to the Conversion system interface board 120 (FIG. 6).
2. Flexibility through programmability.
3. Low cost implementation and established architecture.

All transmitted data is stored in transport packet format. This format is maintained when the various data sources are loaded into the RAM of the PC. The flow of data through the Conversion system is from the PC RAM, across the internal bus 110 of the PC, and then to the Conversion system interface board 120. This data flow occurs at a rate of 32 bits per internal PC bus clock cycle. At the time of developing the Conversion system the maximum data transfer rate of the internal bus of the PC was 132 Mbps (Megabytes per second). This transfer rate exceeds the data rate required to meet MPEG format standards. A typical MPEG compatible output data rate is of the order of 30 Mbps (Megabits per second). Because the data transfer rate of the internal PC bus 110 is higher than the data rate at the output of unit 20 of FIG. 2, it is possible to accommodate a wide variety of data format conversions using the architecture shown in FIG. 6.

Figure 7:
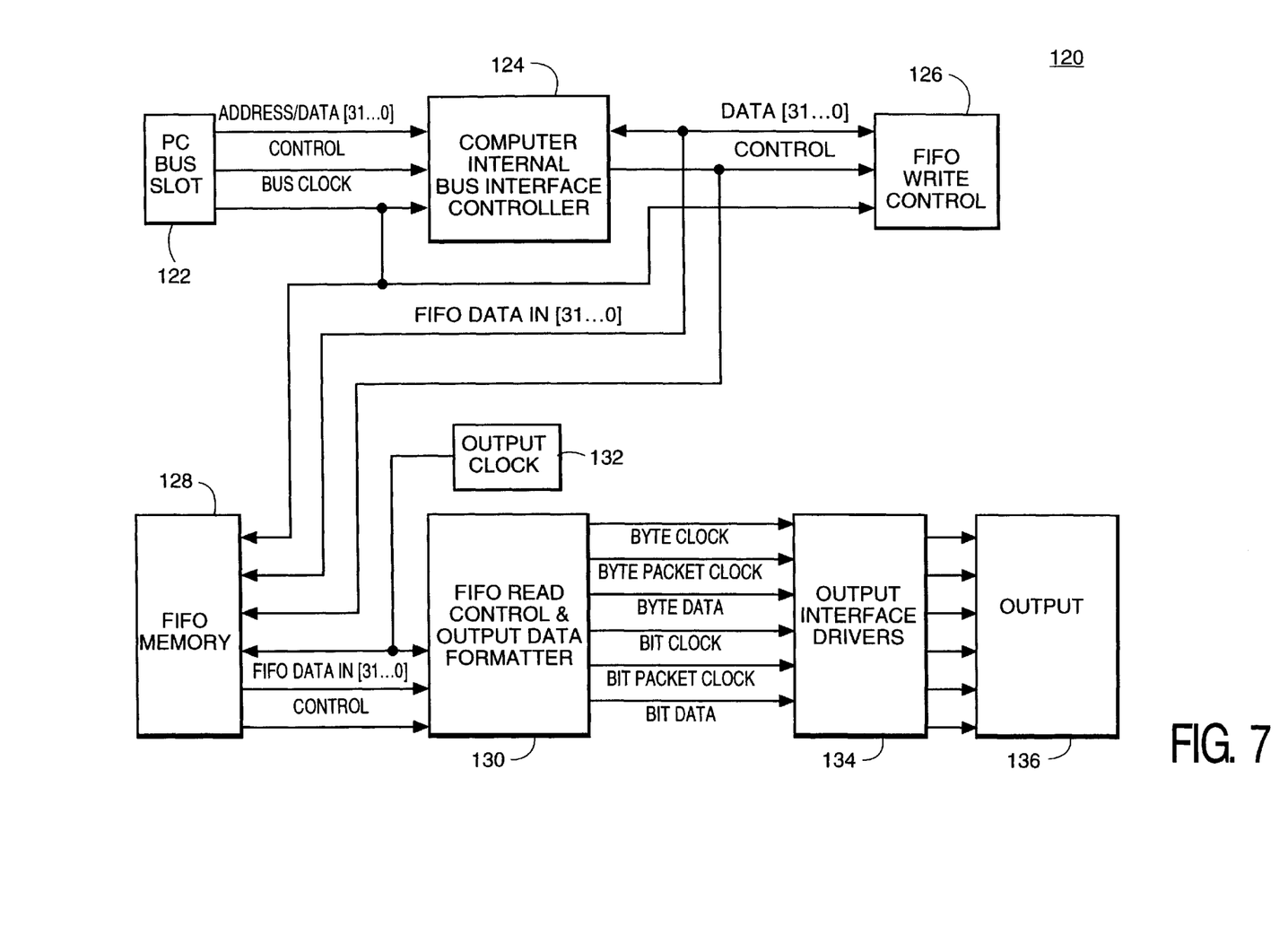
FIG. 7 shows a control and data signal implementation for the computer architecture of FIG. 6.

The Conversion system interface board 120 shown in FIG. 7 performs data rate conversion using FIFO (First-In First-Out) memory 128. Data enters the FIFO at the data transfer rate of the internal PC bus 110 and data leaves the FIFO 128 at the data rate of the multiplexed packet stream being generated. The output data rate of the Conversion system interface board 120 is controlled by oscillator 132 on the board. The frequency of oscillator 132 is interpreted as a bit clock. Even though data flows through the Conversion system interface FIFO 128 at 32 bits at a time, it leaves the Conversion system interface board in either a bit serial format or a byte serial format. Therefore, the output clock that accompanies the data is either the same frequency as the oscillator clock 132, or it is the oscillator clock frequency divided by eight. These two output clocks are used for the bit serial output and byte serial output respectively.

The MPEG standard permits various kinds of user data to be employed in particular applications. System 100 of FIG. 6 generates two categories of user data at the picture layer. The first category includes user data which is essential. Each picture in the MPEG compliant composite bit stream employs this type of user data. For example, essential user data includes synchronization information required by decoder 30. The other category of user data is optional data that implements particular features such as subtitling, for example.

System 100 generates user data fields at the MPEG picture layer to convey synchronization information including Presentation Time Stamp (PTS) and Decoding Time Stamp (DTS) timing indicators. The PTS is designed to synchronize the display process. The PTS specifies the intended time of presentation in the decoder of the associated picture information. The DTS is used to synchronize the decoding process. The DTS indicates the intended time at which the associated picture information is to be decoded. System 100 parses the MPEG elementary video bit stream inputs and calculates PTS and DTS indicators for each picture. The values of the PTS and DTS for a particular picture are computed according to display and decoding characteristics and the picture type, i.e., field picture or frame picture. Both PTS and DTS are measured in the number of periods of the system 100 encoder clock.

In addition, system 100 generates a number of optional user data fields in response to user selection including closed captioning, subtitle, pan and scan, no color burst, chroma flag, and field display flag. Each of these user data types implements a specific function. For example, the pan and scan user data field may be used to convert a 16×9 video picture display format to a 4×3 display format. Upon user selection of the pan and scan option, system 100 software generates the pan and scan user data field and inserts it in the composite output datastream. The subtitle user data field may be used to insert closed captioning in multiple languages in the output composite datastream. This may be used, for example, in areas where English is not the native language and where video receivers do not have built-in closed captioning circuitry. A user may command system 100 to generate and insert subtitle user data in the output composite datastream with any combination of the supported languages via a keyboard interface, remote control, telephone keypad or any other interface system.

System 100 may also be used to create bit streams in a selectable data format for test purposes such as for the multi-channel multi-point distribution system (MMDS) or the digital video disc (DVD), for example.

Following insertion of the user data fields in the composite output datastream, system 100 formats the packets comprising this datastream into MPEG compatible transport packets. Each formatted packet consists of a fixed number of bytes comprising a header and a payload. The transport packet header supports generic transport services such as the encryption control, asynchronous cell multiplexing, and error control. The header consists of control information and a packet identifier (PID) to support the multiplexing capabilities of video, audio, and data services. The header also includes an adaptation field that may be used to pack the variable length MPEG data into fixed length cells. The transport packet payload includes data containing timing and conditional access information, and service specific data related to MPEG video services, for example.

System 100 of FIG. 6 generates the composite output converted datastream by initializing internal software parameters, and by configuring interface board 120 to provide a multiplexed composite output datastream.

An important factor involved in initializing interface board 128 for data packet format conversion is the data rate that is to be used in outputting the composite datastream. The output data rate is dependent on a number of parameters including, transport packet size, the number of error correction bytes per packet, and the output clock frequency. A transport packet size is chosen based on the particular transport protocol desired for the converted composite datastream output format (here MPEG format). As previously discussed, each transport packet has an error correction code appended to it by modulator 22 (FIG. 2). The size of the error correction code is equal to the number of error correction bytes for each transport packet. System 100 (FIG. 6) leaves a gap of bytes at the end of each transmitted packet. This gap has a size equal to the number of error correction bytes desired. Modulator 22 of FIG. 2 inserts an error correction code in the packet stream where the byte gaps are left by system 100. Upon determining a transport packet size, and the number of error correction bytes per packet, a composite output transport stream is generated by multiplexing input data in a manner similar to that previously described in connection with unit 20 of FIG. 2.

Figure 8:
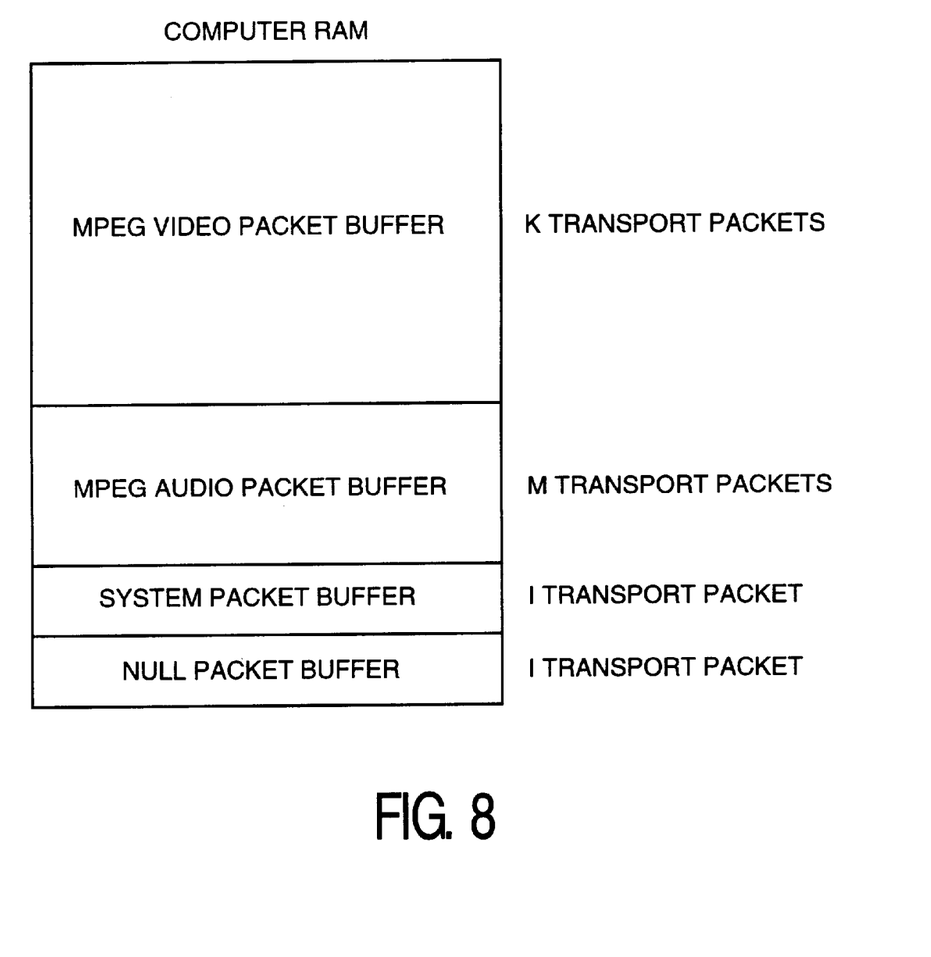
FIG. 8 shows a memory allocation for the computer architecture of FIG. 6.

Upon determination of the transport packet size, the number of error correction bytes per packet, and the output clock frequency, the output information data rate capacity is calculated. The information data rate capacity is interpreted as the maximum rate that data is transmitted through the Conversion system of system 100, without accounting for the additional data added by the error correction code. One bit of data is processed on each cycle of the clock so that the output clock may be interpreted as a bit clock. Therefore, the overall data rate capacity, including the data from the error correction code, is equal to the frequency of the output clock. The overall data rate and the information rate are therefore measured in bps (Bits Per Second). The information data rate capacity is derived as $$R = \frac{P_{size}}{P_{size} + EC_{size}} * \Psi$$

where:

$R$ = Information data rate capacity in bps $\Psi$ = Overall data rate capacity in bps $P_{size}$ = Transport packet size in bytes $EC_{size}$ = Number of error correction bytes FIG. 8 shows a memory allocation for memory 108 of the computer architecture of FIG. 6. Memory 108 is used to sequentially hold video and audio input data packets from the satellite, DVHS™ input sources and system and NULL packets. The allocated system 100 memory is segmented into buffers to store these transport packets. As previously mentioned, the contents of a system packet are the SCR value and the conditional access information. Each transmitted system packet is held in a single buffer and is used to continually update the SCR value because the SCR value represents the current time. The contents of NULL packets do not change over time. Therefore, one transport packet length buffer is also used to hold the NULL packet data.

In order to establish the multiplexing schedule, the data rate for each of the transport packet types must be determined. The data rate for the NULL packet is handled differently however. This is due to the manner in which NULL packets are used. A NULL packet is used as a filler to make up for the unused information data rate capacity left by the other packet types. It is required that the combined data rate of all packet types must equal R. Therefore, the data rate for NULL packets depends on the combined data rate of the other packet types.

System 100 generates an MPEG compatible composite output datastream at a data rate computed to accommodate the data added during the user data insertion and packetization processing. The data added during this processing affects the information data rate required for the MPEG composite transport packet stream. The data rate is computed using the size of the MPEG transport packet data or file being converted, the video frame rate, and the number of compressed frames being converted as follows, $$BR = \frac{F_{size} * 8 * F_{rate}}{F_{count}}$$

where:

$BR$ = information rate or bit rate in bps $F_{size}$ = size in bytes of MPEG transport packet data or file being converted.

$F_{rate}$ = Frame rate in fps (Frames Per Second)

$F_{count}$ = Frame count.

This equation can be used for both MPEG video and MPEG audio transport packet streams.

In addition, system 100 determines the multiplexing ratio for each of the transport packet types. The multiplexing ratio is a dimensionless number which indicates how often a particular transport packet type appears in the multiplexed composite packet stream. This number is a positive fraction between zero and one. A multiplexing ratio is established for all transport packet types with the exception of system packets. The multiplexing ratios for MPEG video, MPEG audio, and NULL packets is determined as follows.

$$M_{R(video)} = \frac{BR_{video}}{R} \in (0, 1)$$

$$M_{R(audio)} = \frac{BR_{audio}}{R} \in (0, 1)$$

$$M_{R(NULL)} = \frac{R}{R} = 1$$

$M_R$ = Multiplexing ratio

A packet schedule is established for each packet type. The packet schedule is a number that indicates when a particular packet type should be sent. After a packet is sent, the associated packet schedule is updated to reflect the next time when its corresponding packet type should be sent. Updating the packet schedule is done by adding the corresponding packet schedule delta to the current packet schedule number. The packet schedule delta equations for each packet type, except for system packets, are shown below.

$$PS_{\Delta(NULL)} = \frac{P_{size} * 8}{M_{R(NULL)}} = P_{size} * 8$$

$$PS_{\Delta(video)} = \frac{P_{size} * 8}{M_{R(video)}} \geq PS_{\Delta(NULL)}$$

$$PS_{\Delta(audio)} = \frac{P_{size} * 8}{M_{R(audio)}} \geq PS_{\Delta(NULL)}$$

where $PS_\Delta$ = Packet schedule delta

The update equation for a packet schedule is given by

PS(n+1)=PS$_\Delta$ for n=0

PS(n+1)=PS(n)+PS$_\Delta$ for n≧0 where

P(n)=Packet schedule at time instant n n=Packet transmission time instant

Because system packets carry the SCR value, the schedule for sending system packets is based on a simple periodic transmission. It is typically required that the SCR value be sent at least once every 100 milliseconds. It is possible to determine when to send a system packet by counting the number of packets that have been transmitted. This is true because knowledge of the information data rate, R, permits a determination of how much time it takes for one transport packet to flow out of the system 100 interface board 120. This time is defined as $P_{time}$. Therefore, $P_{time}$ is calculated as, $$P_{time} = \frac{P_{size} * 8}{R}$$

A system packet is output by system 100 at least every $T_{system}$ seconds. The number of transport packets, N, transmitted for $T_{system}$ seconds to elapse is an integer and N is the greatest integer less than or equal to the value given by, $$N = \frac{T_{system}}{P_{time}}$$

System 100 outputs a system packet when the packet count reaches N.

The SCR values are represented as cycles of the encoder system clock, Ø. Therefore, system 100 may update the SCR value as packets are transmitted from a knowledge of $P_{time}$ and Ø. An initial SCR value is determined based upon a parameter known as the system delay and the initial input PTS value. The system delays the presentation of the first MPEG video frame by the value assigned to it. The update equation for the SCR is therefore, SCR(n)=PTS(0)−SYS$_{delay}$ for n=0

SCR(n)=SCR(n−1)+P$_{time}$*Øfor n>0 where

SCR(n)=SCR value at time n in cycles of Ø

PTS(0)=First input PTS value

SYS$_{delay}$=System delay value

As previously discussed, the data rate for the NULL packet was dependent on the combined data rates of the other packet types. The multiplexed output composite datastream is partitioned into packet slots (see FIG. 5). In the absence of other input data sources, each packet slot in the multiplexed packet stream is occupied by a NULL packet. In this example, the data rate of the NULL packet would be equal to R. However, if an input MPEG video source is added, in some of the packet slots a NULL packet would be replaced by an MPEG video packet. In this example the data rate of the NULL packet will be less than R. This concept can be extended if either more packet types are added to the multiplexed packet stream or if the data rate of one packet type is increased. Therefore, for each packet slot of the multiplexed composite datastream a NULL packet will occupy that slot unless there is another packet type scheduled to fill that packet slot. Consequently, the multiplexing ratio for the NULL packet is one.

The system 100 (FIG. 6) multiplexing algorithm is derived based on treating the multiplexed packet stream as a partition of packet slots. An example of the system 100 multiplexing algorithm is given below for multiplexing audio, video, and NULL packets. The algorithm is readily extended to multiplex video and audio packets from two sources such as the previously discussed satellite and DVHS™ sources. Note that $P_{count}$ is the count of packets that have been transmitted.

1. $P_{count}=P_{count}+1$
   $SCR(n)=SCR(n)+P_{time}*\emptyset$
2. IF:
   $P_{count}=N$
   THEN:
   a) Send a system packet
   b) $PS_{NULL}(n+1)=PS_{NULL}(n)+PS_{\Delta(NULL)}$
   c) $P_{count}=0$
   d) GOTO 1
   ELSE:
   Continue
3. IF:
   $PS_{NULL}<PS_{video}$ and $PS_{NULL}<PS_{audio}$
   THEN:
   a) Send a NULL packet
   b) $PS_{NULL}(n+1)=PS_{NULL}(n)+PS_{\Delta(NULL)}$
   c) GOTO 1
   ELSE IF:
   $PS_{video}\leq PS_{audio}$ and $PS_{video}\leq PS_{NULL}$
   THEN:
   a) Send a video packet
   b) $PS_{video}(n+1)=PS_{video}(n)+PS_{\Delta(video)}$
   c) $PS_{NULL}(n+1)=PS_{NULL}(n)+PS_{\Delta(NULL)}$
   d) GOTO 1
   ELSE:
   a) Send an audio packet
   b) $PS_{audio}(n+1)=PS_{audio}(n)+PS_{\Delta(audio)}$
   c) $PS_{NULL}(n+1)=PS_{NULL}(n)+PS_{\Delta(NULL)}$
   d) GOTO 1

The simplicity of this algorithm permits it to be implemented in real-time using the computer architecture of system 100 of FIG. 6.

The architecture of FIG. 6 is not exclusive. Other architectures may be derived in accordance with the principles of the invention to accomplish the same objectives. Further, the functions of the elements of the FIG. 6 architecture and the process steps of FIG. 1 may be implemented in whole or in part in hardware or within the programmed instructions of a microprocessor such as processor 102 of FIG. 6. In addition, the principles of the invention apply to non-MPEG compatible input and output data formats. Further, it will be appreciated by those of ordinary skill in the art that modifications can be made to the structure and function of the basic invention, without departing from the spirit and scope thereof.

We claim:

1. A method for digital data format conversion, comprising the steps of:
   de-packetizing an input packetized datastream of a first data packet structure;
   adaptively selecting a second data packet structure different to said first data packet structure, said second data packet structure being selected from a plurality of candidate transport protocol packet structures including an MPEG compatible transport protocol packet structure;
   forming a timing recovery parameter for recovering re-packetized data at a data rate exceeding the data rate of said input packetized datastream in response to said second data packet structure;
   re-packetizing said depacketized data in response to said second data packet structure;
   incorporating said timing recovery parameter in said re-packetized data;
   multiplexing said re-packetized data in response to said second data packet structure; and,
   outputting said multiplexed data onto an output channel at said data rate exceeding the data rate of said input packetized datastream.

2. A method according to claim 1, wherein
   at least part of the excess bandwidth produced by using said data rate exceeding the data rate of said input packetized datastream, is occupied by data packets of at least one of the following types (a) error correction data; and (b) null data.

3. A method according to claim 1, wherein said de-packetizing step comprises the step of
   removing header information from packets of said input packetized datastream, and said re-packetizing step comprises the step of
   adding header information compatible with said second data packet structure to said depacketized data.

4. A method according to claim 1, wherein said re-packetizing step comprises the step of
   re-aligning said depacketized data to be aligned with said second data packet structure.

5. A method according to claim 1, further including the step of
   incorporating an error correction code compatible with said second data packet structure within said multiplexed data.

6. A method according to claim 1, further including the step of
   incorporating conditional access information compatible with said second data packet structure within said multiplexed data.

7. A method according to claim 1, further including the step of
   multiplexing said de-packetized data with null data at a relative frequency determined to provide multiplexed data at said data rate exceeding the data rate of said input packetized datastream.

8. A method according to claim 1, wherein said multiplexing step includes the step of
   scheduling said re-packetized data for output at said data rate exceeding the data rate of said input packetized datastream.

9. A method according to claim 1, including the steps of
   scheduling packet insertion for packets of said re-packetized data and packets from a source different to the source of said input packetized datastream, and
   multiplexing said scheduled packets at a relative frequency determined to provide composite multiplexed data for output at said data rate exceeding the data rate of said input packetized datastream.

10. A method according to claim 9, wherein
    at least part of the excess bandwidth produced by using said data rate exceeding the data rate of said input packetized datastream, is occupied by data packets of at least one of the following types (a) null data; (b) conditional access data; (c) timing data; and (d) different program data.

11. A method according to claim 1, wherein said step of forming said timing recovery parameter comprises
    forming clock reference frequency representative data, and at least one of
    (a) a presentation time stamp determining timing of presentation of recovered data, and
    (b) a decoding time stamp determining time of decoding of recovered data.

12. A method according to claim 1, further including the steps of
   demultiplexing an input datastream to form said input packetized datastream, and
   re-aligning said depacketized data to be aligned with said second data packet structure.

13. A method for digital data format conversion, comprising the steps of:
   de-packetizing an input packetized datastream of a first data packet structure;
   forming a timing recovery parameter for recovering re-packetized data at a data rate exceeding the data rate of said input packetized datastream in response to a second data packet structure different to said first data packet structure;
   re-packetizing said depacketized data in response to said second data packet structure;
   incorporating said timing recovery parameter in said re-packetized data;
   scheduling packet insertion for packets of said re-packetized data and packets from a source different to the source of said input packetized datastream;
   multiplexing said scheduled packets at a relative frequency determined to provide composite multiplexed data for output at said data rate exceeding the data rate of said input packetized datastream in response to said second data packet structure; and,
   outputting said multiplexed data onto an output channel at said data rate exceeding the data rate of said input packetized datastream
   wherein
   said source different to the source of said input packetized datastream is an analog source.

14. A method for merging digital data from a plurality of data sources, comprising the steps of:
   de-packetizing a first input packetized datastream of a first data packet structure;
   adaptively selecting a second data packet structure different to said first data packet structure, said second data packet structure being selected from a plurality of candidate transport protocol packet structures including an MPEG compatible transport protocol packet structure;
   de-packetizing a second input packetized datastream of said second data packet structure different to said first data packet structure;
   forming timing recovery parameters for recovering re-packetized data at a data rate exceeding a combined data rate of data in said first and second input packetized datastreams in response to said second data packet structure;
   re-packetizing said first depacketized input data to form first re-packetized data;
   re-packetizing said second depacketized input data to form second re-packetized data;
   incorporating said timing recovery parameters in said first and second re-packetized data;
   multiplexing said first and second re-packetized data in response to said second data packet structure; and,
   outputting said multiplexed data onto an output channel at said data rate exceeding said combined data rate of data in said first and second input packetized datastreams.

15. A method according to claim 14, wherein
   at least part of the excess bandwidth produced by using said data rate exceeding said combined data rate of said data in said first and second input packetized datastreams, is occupied by data packets of at least one of the following types (a) error correction data; and (b) null data.

16. A method according to claim 14, wherein said de-packetizing steps comprise the step of
   removing header information from packets of said first and second input packetized datastreams and wherein said re-packetizing steps comprise the step of
   adding header information compatible with said second data packet structure to said first depacketized input data and to said second depacketized input data.

17. A method according to claim 14, wherein said re-packetizing steps comprise the step of
   re-aligning said first depacketized input data and said second depacketized input data to be aligned with said second data packet structure.

18. A method according to claim 14, further including the step of
   adding an error correction code compatible with said second data packet structure to said multiplexed data.

19. A method according to claim 14, wherein said re-packetizing steps comprise the step of
   incorporating conditional access information compatible with said second data packet structure within said first re-packetized input data and within said second re-packetized input data.

20. A method according to claim 14, further including the step of
   multiplexing said first and second de-packetized data with null data at a relative frequency determined to provide multiplexed data at said data rate exceeding said combined data rate.

21. A method according to claim 14, further including the step of
   scheduling said first and second re-packetized data for output at said data rate exceeding said combined data rate.

22. A method according to claim 21, wherein
   at least part of the excess bandwidth, produced by using said data rate exceeding said combined data rate, is occupied by data packets of at least one of the following types (a) null data; (b) conditional access data; and (c) timing data.

23. A method according to claim 14, further including the steps of
   scheduling packet insertion for packets of said first and second re-packetized data, and
   multiplexing said scheduled packets at a relative frequency determined to provide said multiplexed data at said data rate exceeding said combined data rate.

24. A method according to claim 14, wherein said step of forming said timing recovery parameters comprises
   forming clock reference frequency representative data, and at least one of
   (a) a presentation time stamp determining timing of presentation of recovered data, and
   (b) a decoding time stamp determining time of decoding of recovered data.

25. Data format conversion apparatus for providing data in a desired output format, comprising:
   a processor, including a central processing unit, a cache, a memory controller, a system memory, an internal system bus, a storage device memory, a storage device controller, a graphics controller and a monitor; and a system interface for packetizing at least two signals of different packet structure from two signal sources, multiplexing data from said at least two signals, producing an encoded output in an adaptively selected data format at a data rate exceeding a combined data rate of data from said two signals by multiplexing data from said two signals with null data at a relative frequency determined to provide multiplexed data at said data rate exceeding said combined data rate, said system interface being coupled to said processor via said system bus wherein said encoded output serves as the input for a decoding system and at least part of the excess bandwidth produced by using said data rate exceeding said combined data rate is occupied by error correction data.

26. Apparatus according to claim 25, wherein said system interface includes:

means for scheduling said data from said two signals and said null data for output at said data rate exceeding said combined data rate.

* * * * *